(12) United States Patent  
Hasegawa et al.

(10) Patent No.: US 9,164,333 B2  
(45) Date of Patent: Oct. 20, 2015

(54) LIQUID CRYSTAL DISPLAY DEVICE

(71) Applicant: Japan Display Inc., Minato-ku (JP)

(72) Inventors: Hitomi Hasegawa, Tokyo (JP); Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 23 days.

(21) Appl. No.: 14/202,087

(22) Filed: Mar. 10, 2014

(65) Prior Publication Data

US 2014/0267997 A1    Sep. 18, 2014

(30) Foreign Application Priority Data

Mar. 14, 2013    (JP) ................................. 2013-052443

(51) Int. Cl.
*G02F 1/1343*    (2006.01)
*G02F 1/1333*    (2006.01)
*G02F 1/1337*    (2006.01)

(52) U.S. Cl.
CPC .... *G02F 1/134363* (2013.01); *G02F 1/133707* (2013.01)

(58) Field of Classification Search
CPC .............. G02F 1/134363; G02F 2001/134381; G02F 2001/134318
USPC .......................... 349/129, 138–139, 141, 144
See application file for complete search history.

(56) References Cited

U.S. PATENT DOCUMENTS

| | | |
|---|---|---|
| 6,266,116 B1 | 7/2001 | Ohta et al. |
| 2001/0010575 A1 | 8/2001 | Yoshida et al. |
| 2004/0165136 A1 | 8/2004 | Sugiyama et al. |
| 2005/0052603 A1* | 3/2005 | Jin ................................. 349/141 |
| 2005/0162893 A1 | 7/2005 | Yagi et al. |
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0106684 A1* | 5/2008 | Chae et al. ..................... 349/138 |
| 2008/0180590 A1 | 7/2008 | Lee et al. |
| 2008/0180623 A1 | 7/2008 | Lee et al. |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

Office Action issued May 31, 2015 in Korean Patent Application No. 10-2014-0027197 (with English translation).

*Primary Examiner* — Nathanael R Briggs
(74) *Attorney, Agent, or Firm* — Oblon, McClelland, Maier & Neustadt, L.L.P.

(57) ABSTRACT

According to one embodiment, a liquid crystal display device includes a first common electrode including a first sub-common electrode extending along a gate line on a first interlayer insulation film, a pixel electrode which includes a first main pixel electrode extending in a second direction on a second interlayer insulation film, and a second common electrode which includes a second sub-common electrode extending in parallel to the first sub-common electrode on the second interlayer insulation film and has the same potential as the first common electrode. The first sub-common electrode is located on the pixel electrode side of a position overlapping the gate line. The second sub-common electrode is opposed to the gate line.

16 Claims, 11 Drawing Sheets

(56) References Cited

U.S. PATENT DOCUMENTS

| | | |
|---|---|---|
| 2008/0186439 A1 | 8/2008 | Kwon et al. |
| 2008/0309841 A1 | 12/2008 | Yagi et al. |
| 2011/0025937 A1 | 2/2011 | Yagi et al. |
| 2012/0206686 A1* | 8/2012 | Cho et al. .................. 349/143 |
| 2014/0036214 A1 | 2/2014 | Hirosawa |
| 2014/0055430 A1 | 2/2014 | Hirosawa et al. |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-192822 | 8/2009 |
| KR | 1999-0068095 | 8/1999 |
| KR | 2003-0011692 | 2/2003 |
| KR | 10-2004-0091184 | 10/2004 |
| KR | 10-2005-0097175 | 10/2005 |
| WO | 2012/137540 A1 | 10/2012 |
| WO | 2012/137541 A1 | 10/2012 |

* cited by examiner

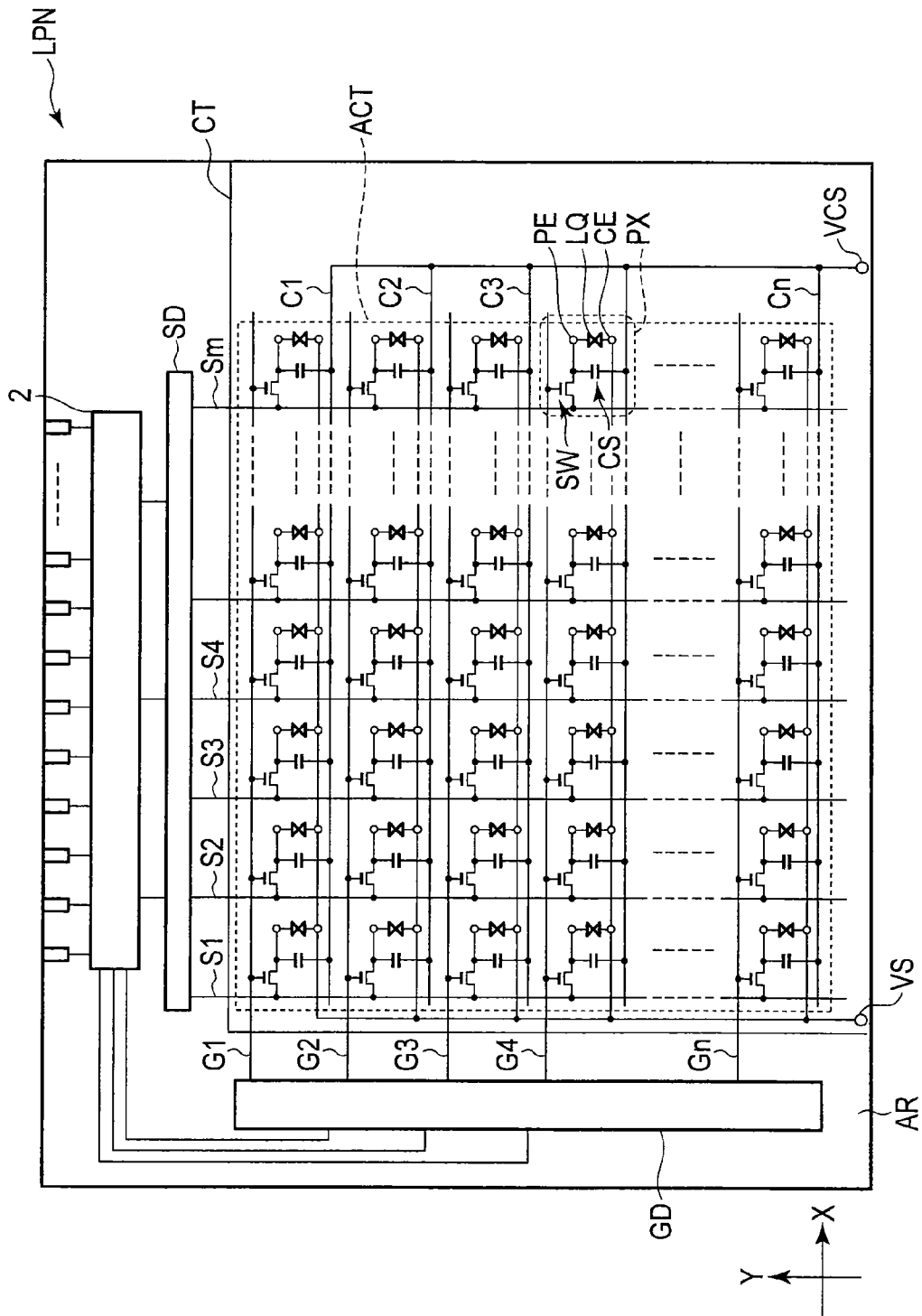
F I G. 1

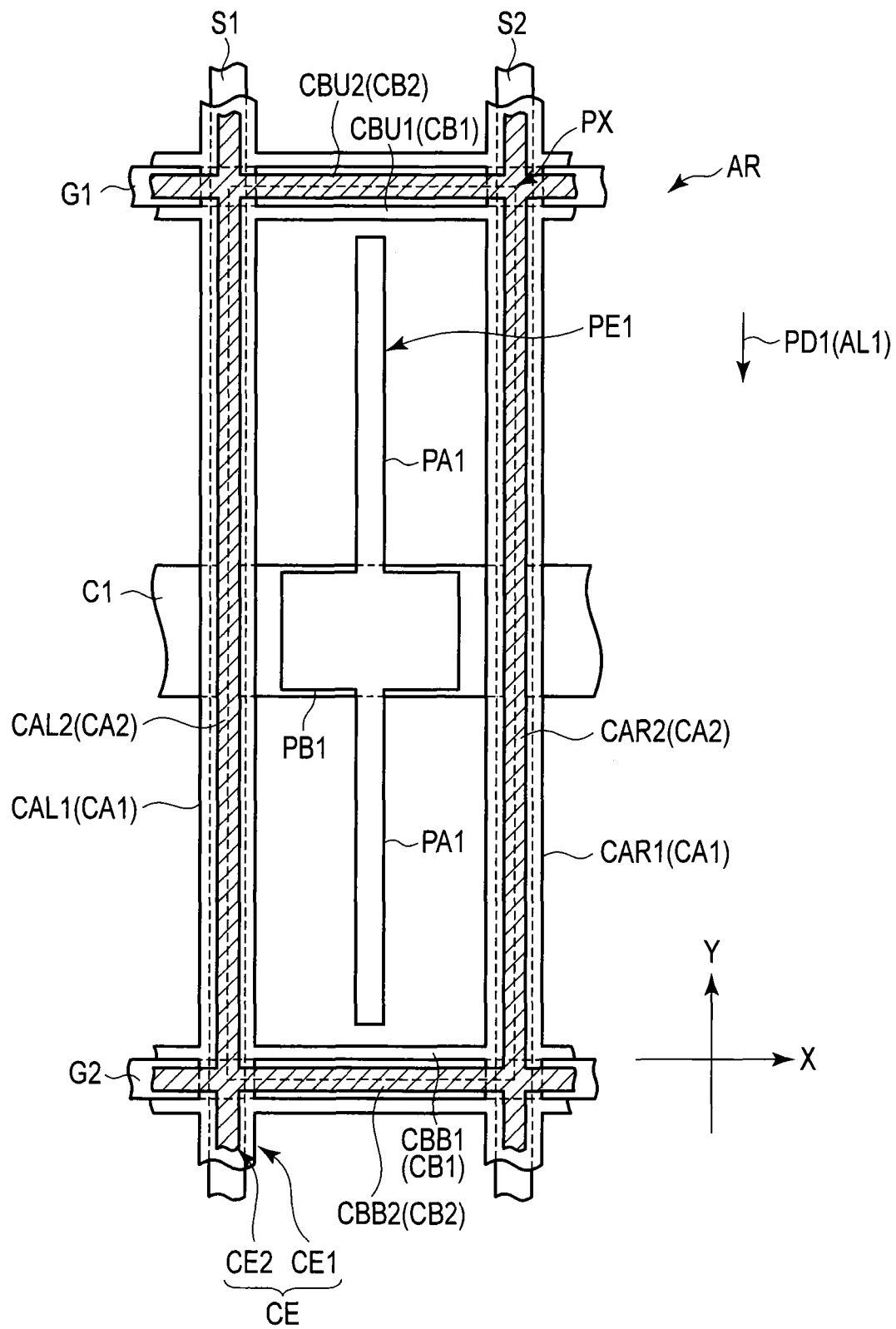
F I G. 2

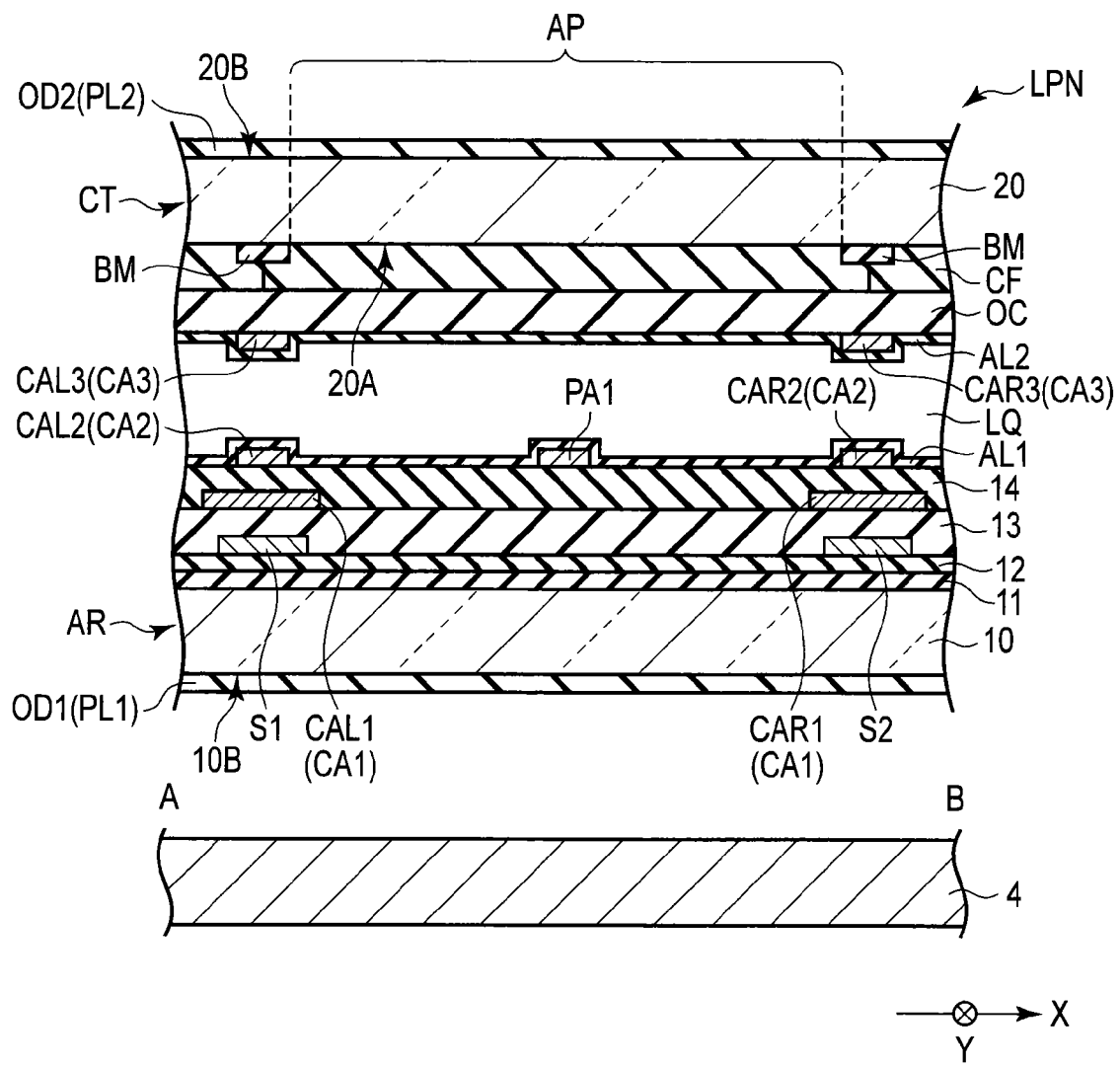
F I G. 4

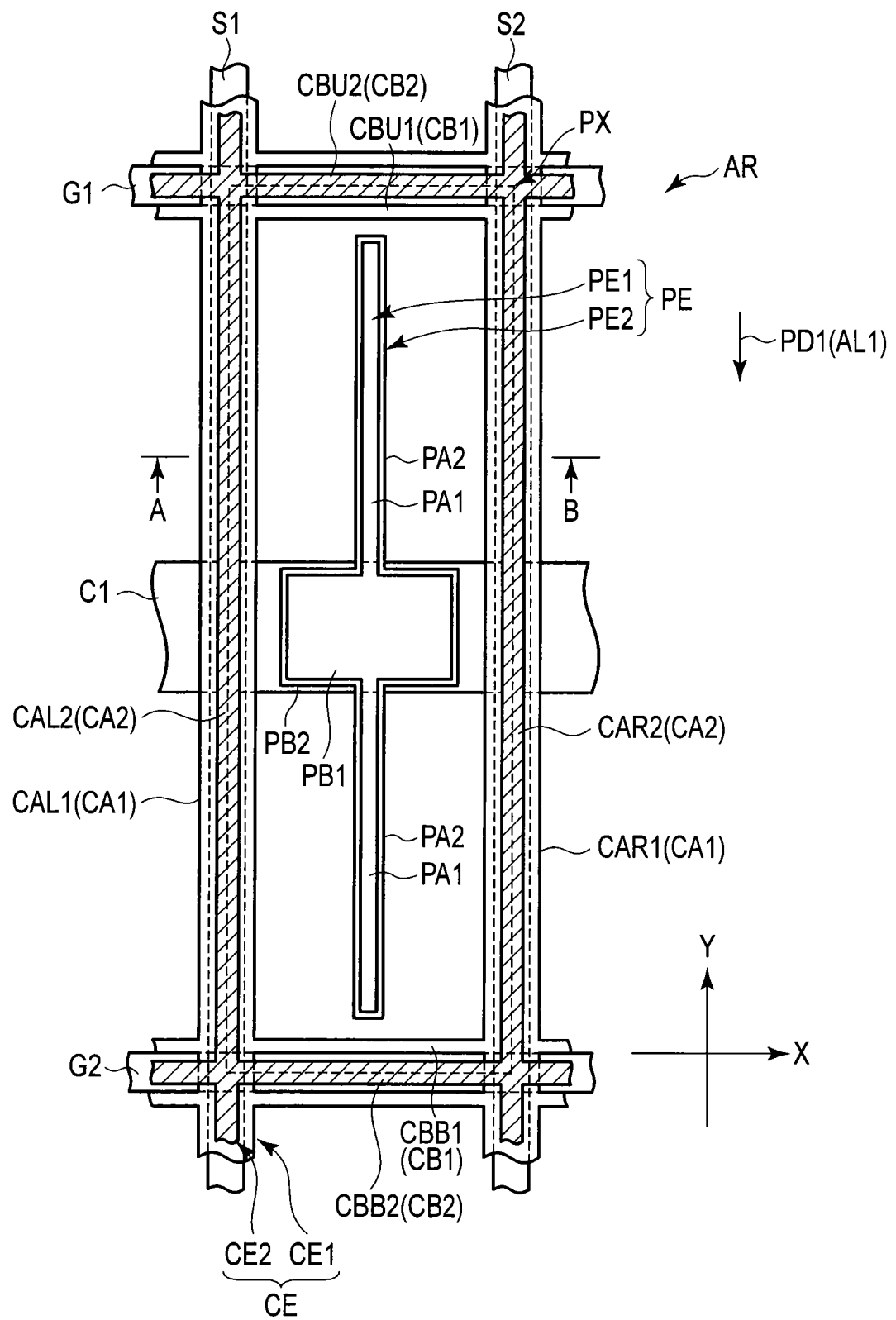
F I G. 6A

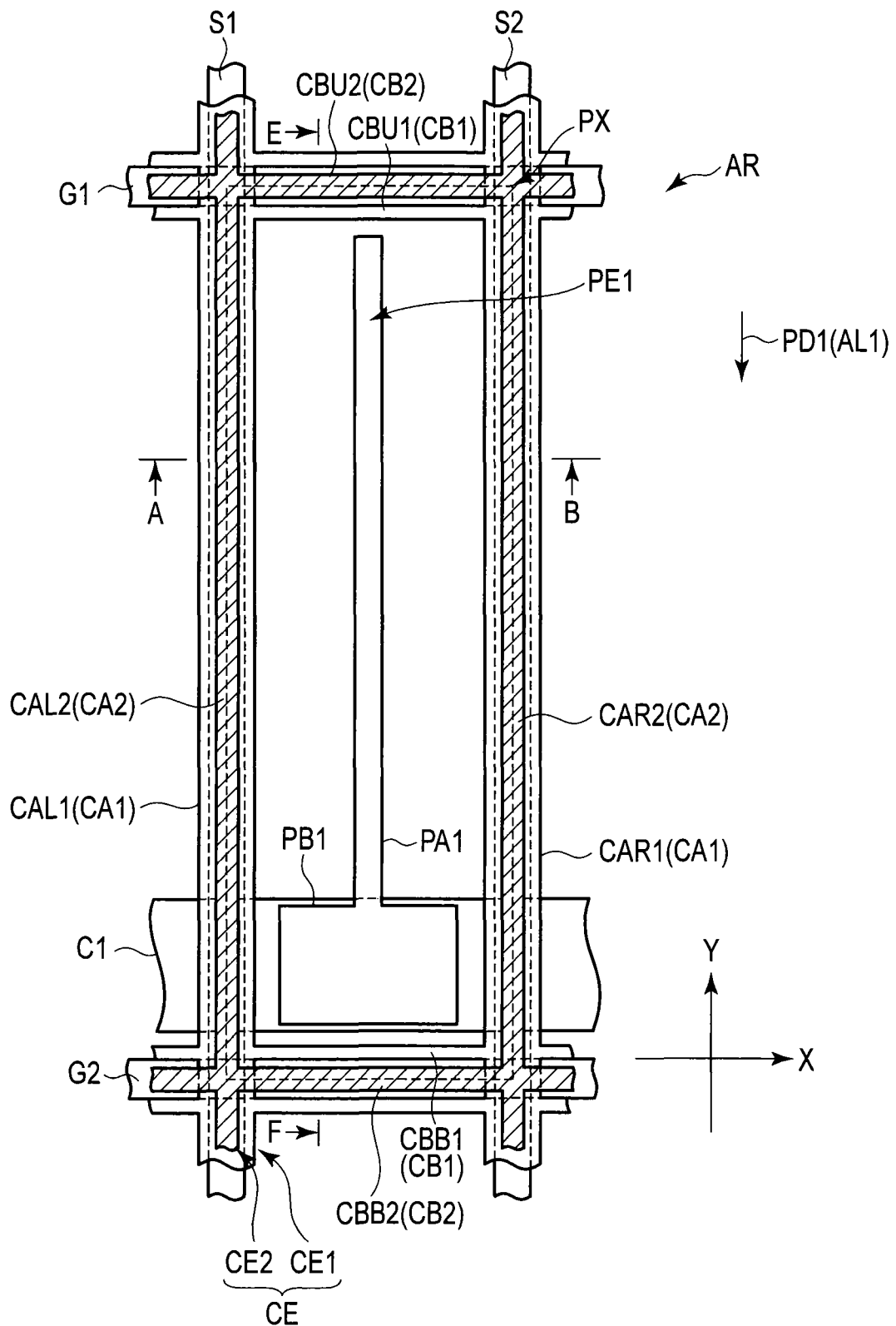
F I G. 7

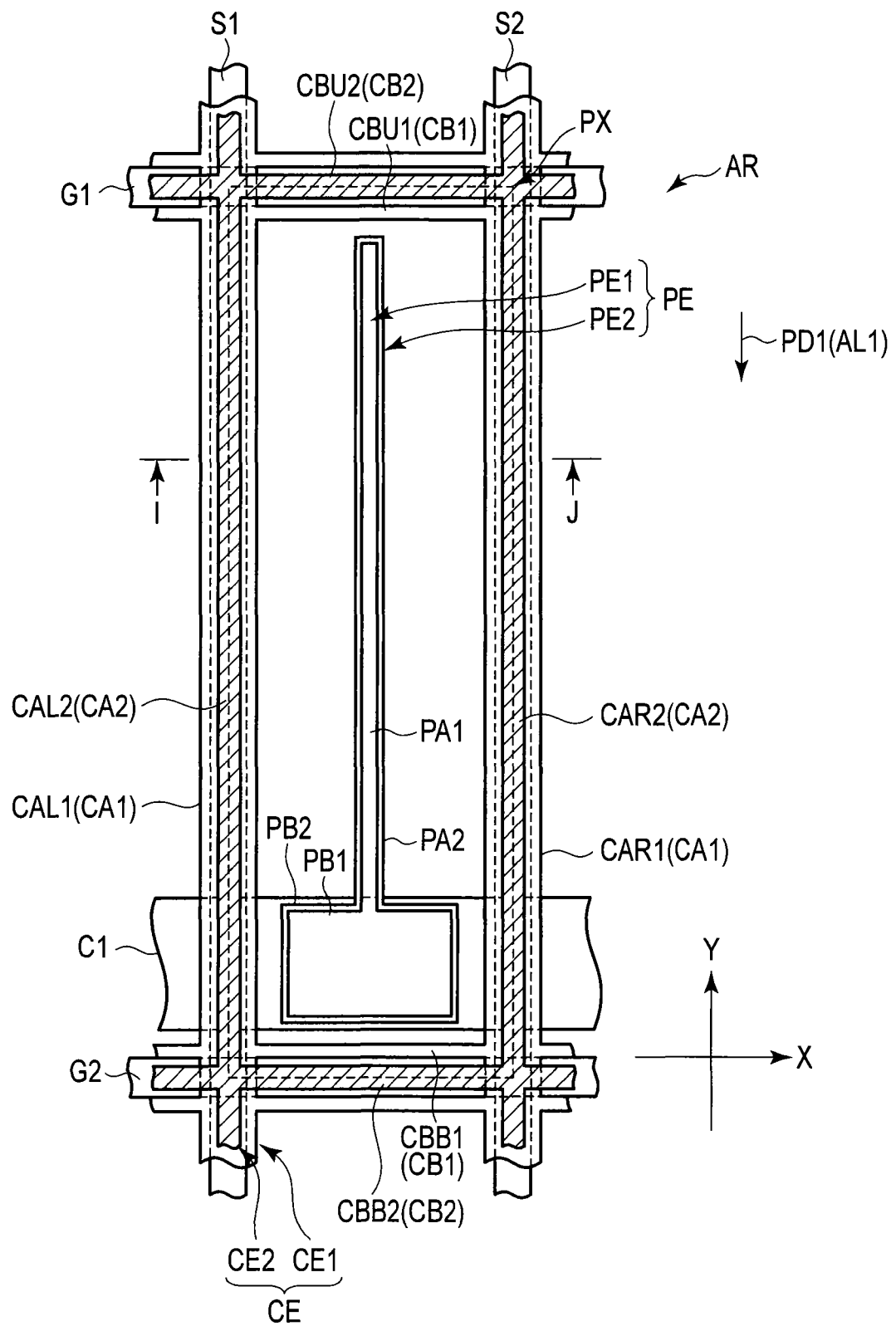
F I G. 9

LIQUID CRYSTAL DISPLAY DEVICE

CROSS-REFERENCE TO RELATED APPLICATIONS

This application is based upon and claims the benefit of priority from Japanese Patent Application No. 2013-052443, filed Mar. 14, 2013, the entire contents of which are incorporated herein by reference.

FIELD

Embodiments described herein relate generally to a liquid crystal display device.

BACKGROUND

In recent years, in active matrix liquid crystal devices in which switching elements are incorporated in respective pixels, configurations, which make use of a lateral electric field (including a fringe electric field), such as an IPS (In-Plane Switching) mode or an FFS (Fringe Field Switching) mode, have been put to practical use. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

In connection with the lateral electric field mode, there has been proposed a technique wherein a lateral electric field or an oblique electric field is produced between a pixel electrode formed on an array substrate and a counter-electrode formed on a counter-substrate, thereby switching liquid crystal molecules. There has been proposed, among others, a technique of producing a lateral electric field or an oblique electric field by combining a cross-shaped pixel electrode or an I-shaped pixel electrode, and a common electrode on a source line.

BRIEF DESCRIPTION OF THE DRAWINGS

FIG. 1 is a view which schematically illustrates a structure and an equivalent circuit of a liquid crystal display device according to an embodiment.

FIG. 2 is a plan view which schematically shows a structure example of one pixel PX at a time when an array substrate AR shown in FIG. 1 is viewed from a counter-substrate side.

FIG. 4 is a schematic cross-sectional view, taken along line A-B in FIG. 3, showing a cross-sectional structure of a liquid crystal display panel LPN shown in FIG. 3.

FIG. 6A is a plan view which schematically illustrates another structure example of the pixel PX at a time when the array substrate AR shown in FIG. 1 is viewed from the counter-substrate side.

FIG. 7 is a plan view which schematically illustrates another structure example of the pixel PX at a time when the array substrate AR shown in FIG. 1 is viewed from the counter-substrate side.

FIG. 9 is a plan view which schematically illustrates another structure example of the pixel PX at a time when the array substrate AR shown in FIG. 1 is viewed from the counter-substrate side.

DETAILED DESCRIPTION

Figure 3:
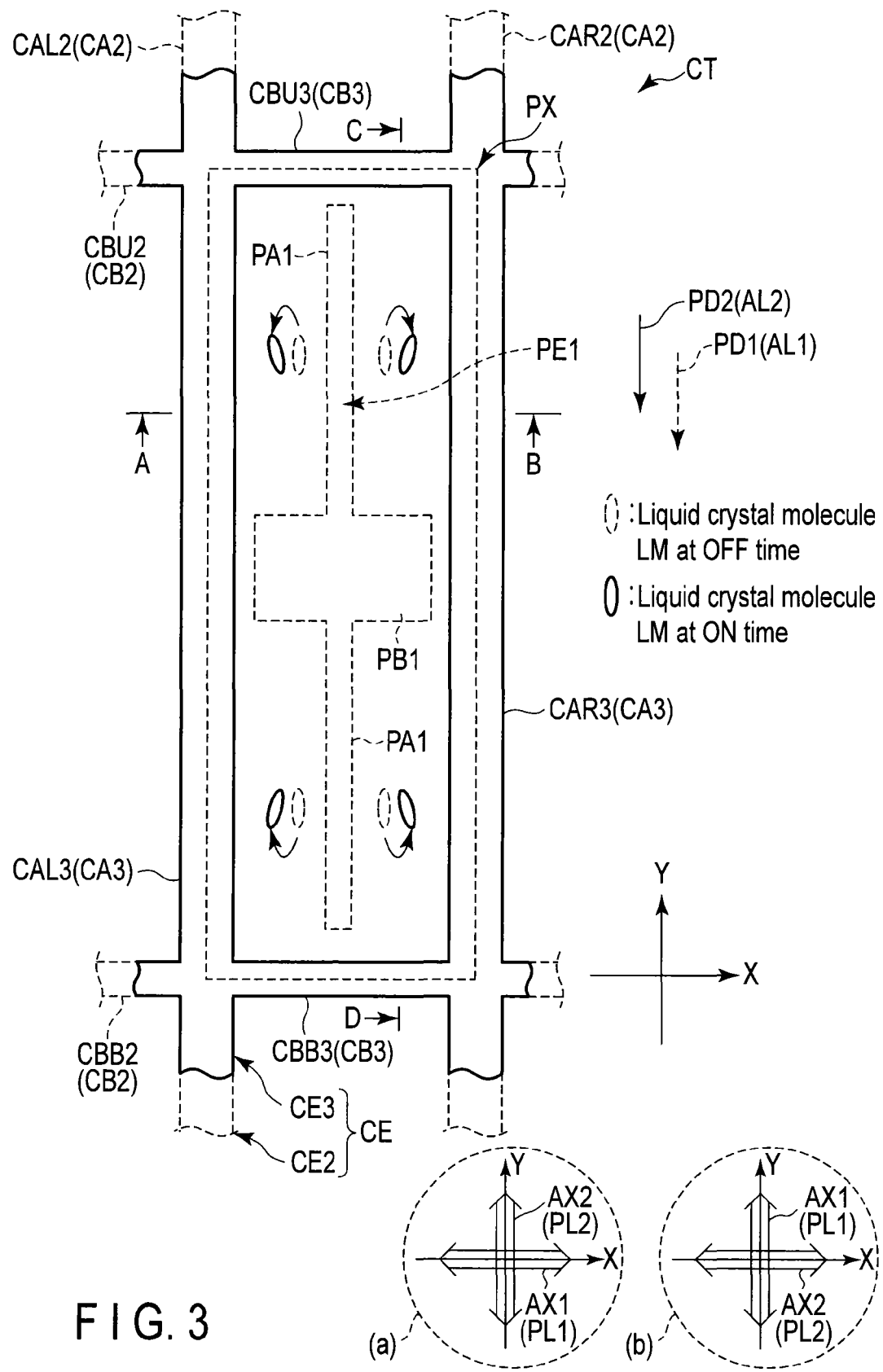
FIG. 3 is a plan view which schematically shows a structure example of one pixel PX in a counter-substrate CT shown in FIG. 1.

In general, according to one embodiment, a liquid crystal display device includes: a first substrate including a gate line extending in a first direction, a source line extending in a second direction crossing the first direction, a switching element electrically connected to the gate line and the source line, a first interlayer insulation film located above the gate line and the source line, a first common electrode including a first sub-common electrode extending along the gate line on the first interlayer insulation film, a second interlayer insulation film covering the first common electrode, a pixel electrode which includes a first main pixel electrode extending in the second direction on the second interlayer insulation film and is electrically connected to the switching element, and a second common electrode which includes a second sub-common electrode extending in parallel to the first sub-common electrode on the second interlayer insulation film and has the same potential as the first common electrode, the first sub-common electrode being located on the pixel electrode side of a position overlapping the gate line, and the second sub-common electrode being opposed to the gate line; a second substrate including a third common electrode which includes a third main common electrode extending in the second direction and a third sub-common electrode opposed to the second sub-common electrode, the third common electrode having the same potential as the second common electrode; and a liquid crystal layer held between the first substrate and the second substrate.

According to another embodiment, a liquid crystal display device includes: a first substrate including a first gate line and a second gate line each extending in a first direction, a first source line and a second source line each extending in a second direction crossing the first direction, a switching element electrically connected to the first gate line and the first source line, a first interlayer insulation film located above the first gate line, the second gate line, the first source line and the second source line, a first common electrode with a grid shape extending along the first gate line, the second gate line, the first source line and the second source line on the first interlayer insulation film, a second interlayer insulation film covering the first common electrode, a pixel electrode which includes a first main pixel electrode extending in the second direction on the second interlayer insulation film and is electrically connected to the switching element, and a second common electrode which has a grid shape extending in parallel to the first common electrode on the second interlayer insulation film and has the same potential as the first common electrode, the first common electrode including a first segment located on the pixel electrode side of a position overlapping the first gate line and a second segment located on the pixel electrode side of a position overlapping the second gate line, and the second common electrode including a third segment opposed to the first gate line and a fourth segment opposed to the second gate line; a second substrate including a third common electrode having a grid shape opposed to the second common electrode and having the same potential as the second common electrode; and a liquid crystal layer held between the first substrate and the second substrate.

According to another embodiment, a liquid crystal display device includes: a first substrate including a first gate line and a second gate line each extending in a first direction, a first source line and a second source line each extending in a second direction crossing the first direction, a switching element electrically connected to the first gate line and the first source line, a first interlayer insulation film located above the first gate line, the second gate line, the first source line and the second source line, a first common electrode with a grid shape extending along the first gate line, the second gate line, the first source line and the second source line on the first interlayer insulation film, a second interlayer insulation film covering the first common electrode, a pixel electrode which includes a first main pixel electrode extending in the second direction on the second interlayer insulation film and is electrically connected to the switching element, and a second common electrode which has a grid shape extending in parallel to the first common electrode on the second interlayer insulation film and has the same potential as the first common electrode, the first common electrode including a first segment located on the pixel electrode side of a position overlapping the first gate line and a second segment located on the pixel electrode side of a position overlapping the second gate line, and the second common electrode including a third segment opposed to the first gate line and a fourth segment opposed to the second gate line; a second substrate disposed to be opposed to the first substrate; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

The liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, gate lines G (G1 to Gn), storage capacitance lines C (C1 to Cn), and source lines S (S1 to Sm). The gate lines G correspond to signal lines which extend, for example, substantially linearly in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S correspond to signal lines which extend substantially linearly in the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR. The gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane (or a substrate major surface) which is defined by the first direction X and second direction Y (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon, etc.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE may be formed of, for example, a transparent, electrically conductive material such as indium tin oxide (ITO) or indium zinc oxide (IZO), or may be formed of an opaque wiring material such as aluminum (Al), titanium (Ti), silver (Ag), molybdenum (Mo), tungsten (W), copper (Cu) or chromium (Cr).

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

Next, a structure example of one pixel, which is disposed in the active area, is described.

FIG. 2 is a plan view which schematically shows the structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a first pixel electrode PE1 included in a pixel electrode PE, and a first alignment film AL1. In the example illustrated, the array substrate AR further includes a first common electrode CE1 and a second common electrode CE2 which are included in a common electrode CE.

The gate line G1 and gate line G2 are disposed with a distance in the second direction Y, and extend in the first direction X. The storage capacitance line C1 is disposed between the gate line G1 and gate line G2, and extends in the first direction X. In the example illustrated, the storage capacitance line C1 is located at a substantially middle point between the gate line G1 and the gate line G2. Specifically, the distance between the gate line G1 and storage capacitance line C1 in the second direction Y is substantially equal to the distance between the gate line G2 and storage capacitance line C1 in the second direction Y. The source line S1 and source line S2 are disposed with a distance in the first direction X, and extend in the second direction Y. The pixel electrode PE is disposed between the neighboring source line S1 and source line S2. In addition, the pixel electrode PE is disposed between the gate line G1 and gate line G2.

In the example illustrated, as indicated by a broken line in the Figure, the pixel PX corresponds to a grid-shaped area defined by the gate line G1, gate line G2, source line Si and source line S2, and has a rectangular shape having a less length in the first direction X than in the second direction Y. The length of the pixel PX in the first direction X corresponds to the pitch between the source line S1 and source line S2 in the first direction X. The length of the pixel PX in the second direction Y corresponds to the pitch between the gate line G1 and gate line G2 in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is located at an upper side end portion, and is disposed to extend over a boundary between the pixel PX and a pixel neighboring on the upper side. The gate line G2 is located at a lower side end portion, and is disposed to extend over a boundary between the pixel PX and a pixel neighboring on the lower side. The storage capacitance line C1 is disposed at a substantially central part of the pixel PX.

A switching element, which is not shown, is electrically connected to, for example, the gate line G1 and source line S1. A semiconductor layer of the switching element extends below the source line S1, crosses the gate line G1, and extends below the storage capacitance line C1. A source electrode of the switching element corresponds to that region of the source line S1, which is in contact with the semiconductor layer. A gate electrode of the switching element corresponds to that region of the gate line G1, which crosses the semiconductor layer. A drain electrode of the switching element is in contact with the semiconductor layer extending under the storage capacitance line C1.

The first pixel electrode PE1 includes a first main pixel electrode PA1 and a first sub-pixel electrode PB1. The first main pixel electrode PA1 and first sub-pixel electrode PB1 are formed integral or continuous, and are electrically connected to each other. The first main pixel electrode PA1 is located at a substantially middle point between the source line S1 and source line S2, and linearly extends in the second direction Y to the vicinity of the upper side end portion of the pixel PX and to the vicinity of the lower side end portion of the pixel PX. Specifically, a distance in the first direction X between the source line S1 and first main pixel electrode PA1 is substantially equal to a distance in the first direction X between the source line S2 and first main pixel electrode PA1. The first main pixel electrode PA1 is formed in a strip shape having a substantially uniform width in the first direction X. The first sub-pixel electrode PB1 is located at a substantially middle point between the gate line G1 and gate line G2, and linearly extends in the first direction X to the vicinity of the left side end portion of the pixel PX and to the vicinity of the right side end portion of the pixel PX. Specifically, the first sub-pixel electrode PB1 is located at a substantially central part of the pixel PX, is located at a position overlapping the storage capacitance line C1, and crosses a substantially middle portion in the second direction Y of the first main pixel electrode PA1. In other words, the first pixel electrode PE1 illustrated in the Figure is formed in a cross shape. Although the first sub-pixel electrode PB1 is formed in a strip shape having a substantially uniform width in the second direction Y, the shape of the first sub-pixel electrode PB1 is not limited to this example. The first pixel electrode PE1 is electrically connected to the switching element at the first sub-pixel electrode PB1 located at a position overlapping the storage capacitance line C1.

The first common electrode CE1 includes a first main common electrode CA1 and a first sub-common electrode CB1. The first main common electrode CA1 and first sub-common electrode CB1 are formed integral or continuous, and are electrically connected to each other. The first main common electrode CA1 extends in the second direction Y, and the first sub-common electrode CB1 extends in the first direction X. Specifically, the first common electrode CE1 is formed of the first main common electrode CA1 and first sub-common electrode CB1 in a grid shape which partitions the pixel PX.

The first main common electrode CA1 extends along the source line S. The first main common electrode CA1, in the X-Y plane, is located on both sides of the first main pixel electrode PA1. The first main common electrode CA1 is formed in a strip shape having a substantially uniform width in the first direction X.

The electrode width of the first main common electrode CA1 in the first direction X is greater than, for example, the line width of the source line S in the first direction X. In the example illustrated, the first main common electrode CA1 includes a first main common electrode CAL1 which is located at the left side end portion of the pixel PX and is disposed to extend over a boundary between the pixel PX and a pixel neighboring on the left side, and a first main common electrode CAR1 which is located at the right side end portion of the pixel PX and is disposed to extend over a boundary between the pixel PX and a pixel neighboring on the right side. The first main common electrode CAL1 is opposed to the source line S1, and the first main common electrode CAR1 is opposed to the source line S2. The first main common electrode CAL1 is disposed at a position overlapping the source line S1, and extends to the first pixel electrode PE1 side. The first main common electrode CAR1 is disposed at a position overlapping the source line S2, and extends to the first pixel electrode PE1 side.

The first sub-common electrode CB1 extends along the gate line G. The first sub-common electrode CB1 is formed in a strip shape. The first sub-common electrode CB1 is disposed on the first pixel electrode PE1 side of a position overlapping the gate line G. In the example illustrated, the first sub-common electrode CB1 includes a first sub-common electrode (first segment) CBU1 which is located at the upper side end portion of the pixel PX, extends along the gate line G1, and is located on the first pixel electrode PE1 side of a position overlapping the gate line G1, and a first sub-common electrode (second segment) CBB1 which is located at the lower side end portion of the pixel PX, extends along the gate line G2, and is located on the first pixel electrode PE1 side of a position overlapping the gate line G2. In the meantime, a part of the first sub-common electrode CBU1 may extend to a position overlapping the gate line G1, and a part of the first sub-common electrode CBB1 may extend to a position overlapping the gate line G2.

The second common electrode CE2 includes a second main common electrode CA2 and a second sub-common electrode CB2. The second main common electrode CA2 and second sub-common electrode CB2 are formed integral or continuous, and are electrically connected to each other. The second main common electrode CA2 extends in the second direction Y, and the second sub-common electrode CB2 extends in the first direction X. Specifically, the second common electrode CE2 is formed of the second main common electrode CA2 and second sub-common electrode CB2 in a grid shape which partitions the pixel PX. The first common electrode CE1 and second common electrode CE2 are spaced apart from the first pixel electrode PE1, and surround the first pixel electrode PE1. The first common electrode CE1 and second common electrode CE2 are electrically connected to each other, have the same potential, and are connected to the power supply module VS on the outside of the active area ACT.

The second main common electrode CA2 is located above the source line S, and extends in parallel to the first main common electrode CA1. The second main common electrode CA2, in the X-Y plane, is located on both sides of the first main pixel electrode PA1. The second main common electrode CA2 is formed in a strip shape having a substantially uniform width in the first direction X. The electrode width of the second main common electrode CA2 in the first direction X is less than, for example, the line width of the source line S in the first direction X. In the example illustrated, the second main common electrode CA2 includes a second main common electrode CAL2 which is located at the left side end portion of the pixel PX and is disposed to extend over a boundary between the pixel PX and a pixel neighboring on the left side, and a second main common electrode CAR2 which is located at the right side end portion of the pixel PX and is disposed to extend over a boundary between the pixel PX and a pixel neighboring on the right side. The second main common electrode CAL2 is opposed to the first main common electrode CAL1, and the second main common electrode CAR2 is opposed to the first main common electrode CAR1.

The second sub-common electrode CB2 is opposed to the gate line G, and extends in parallel to the first sub-common electrode CB1. The second sub-common electrode CB2 is formed in a strip shape having a substantially uniform width in the second direction Y. The electrode width of the second sub-common electrode CB2 in the second direction Y is less than, for example, the line width of the gate line G in the second direction Y. In the example illustrated, the second sub-common electrode CB2 includes a second sub-common electrode (third segment) CBU2 which is located at the upper side end portion of the pixel PX, extends along the gate line G1, and is opposed to the gate line G1, and a second sub-common electrode (fourth segment) CBB2 which is located at the lower side end portion of the pixel PX, extends along the gate line G2, and is opposed to the second gate line G2.

Paying attention to the positional relationship between the first pixel electrode PE1 and the first common electrode CE1, the first main pixel electrode PA1 and first main common electrode CA1 are substantially parallel in the X-Y plane, and are alternately arranged in the first direction X. The first pixel electrode PE1 includes one main pixel electrode PA1 which is located between the first main common electrode CAL1 and first main common electrode CAR1 which neighbor with a distance in the first direction X (or between the neighboring source lines).

In the array substrate AR, the first pixel electrode PE1 and second common electrode CE2 are covered with the first alignment film AL1. The first alignment film AL1 is subjected to alignment treatment in a first alignment treatment direction PD1 for initially aligning the liquid crystal molecules of the liquid crystal layer LQ. The first alignment treatment direction PD1 is substantially parallel to the second direction Y.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and only the first pixel electrode PE1 and second common electrode CE2 of the array substrate are indicated by broken lines.

The counter-substrate CT includes a third common electrode CE3 which is a part of the common electrode CE. The third common electrode CE3 includes a third main common electrode CA3 and a third sub-common electrode CB3. The third main common electrode CA3 and third sub-common electrode CB3 are formed integral or continuous, and are electrically connected to each other. The third main common electrode CA3 extends in the second direction Y, and the third sub-common electrode CB3 extends in the first direction X. Specifically, the third common electrode CE3 is formed of the third main common electrode CA3 and third sub-common electrode CB3 in a grid shape which partitions the pixel PX. In addition, the third common electrode CE3 is electrically connected to the first common electrode CE1 and second common electrode CE2, for example, on the outside of the active area, and have the same potential as the first common electrode CE1 and second common electrode CE2.

The third main common electrode CA3 is opposed to the second main common electrode CA2, and extends in parallel to the second main common electrode CA2. The third main common electrode CA3 is formed in a strip shape having a substantially uniform width in the first direction X. The width of the third main common electrode CA3 is equal to the width of the second main common electrode CA2, and is less than, for example, the width of the source line S. In the example illustrated, the third main common electrode CA3 includes a third main common electrode CAL3 which is located at the left side end portion of the pixel PX and is disposed to extend over a boundary between the pixel PX and a pixel neighboring on the left side, and a third main common electrode CAR3 which is located at the right side end portion of the pixel PX and is disposed to extend over a boundary between the pixel PX and a pixel neighboring on the right side. The third main common electrode CAL3 is opposed to the second main common electrode CAL2, and the third main common electrode CAR3 is opposed to the second main common electrode CAR2.

The third sub-common electrode CB3 is opposed to the second sub-common electrode CB2, and extends in parallel to the second sub-common electrode CB2. The third sub-common electrode CB3 is formed in a strip shape having a substantially uniform width in the second direction Y. The width of the third sub-common electrode CB3 is equal to the width of the second sub-common electrode CB2, and is less than, for example, the width of the gate line G. In the example illustrated, the third sub-common electrode CB3 includes a third sub-common electrode CBU3 which is located at the upper side end portion of the pixel PX and is disposed to extend over a boundary between the pixel PX and a pixel neighboring on the upper side, and a third sub-common electrode CBB3 which is located at the lower side end portion of the pixel PX and is disposed to extend over a boundary between the pixel PX and a pixel neighboring on the lower side. The third sub-common electrode CBU3 is opposed to the first sub-common electrode CBU1, and the third sub-common electrode CBB3 is opposed to the first sub-common electrode CBB1.

In the counter-substrate CT, the third common electrode CE3 is covered with the second alignment film AL2. The second alignment film AL2 is subjected to alignment treatment in a second alignment treatment direction PD2 for initially aligning the liquid crystal molecules of the liquid crystal layer LQ. The second alignment treatment direction PD2 is substantially parallel to the first alignment treatment direction PD1. In the example illustrated, the second alignment treatment direction PD2 and the first alignment treatment direction PD1 are identical. In the meantime, the first alignment treatment direction PD1 and the second alignment treatment direction PD2 may be opposite to each other, or may be identical in a direction reverse to the direction in the illustrated example, that is, in a direction from the gate line G2 toward the gate line G1.

Figure 5:
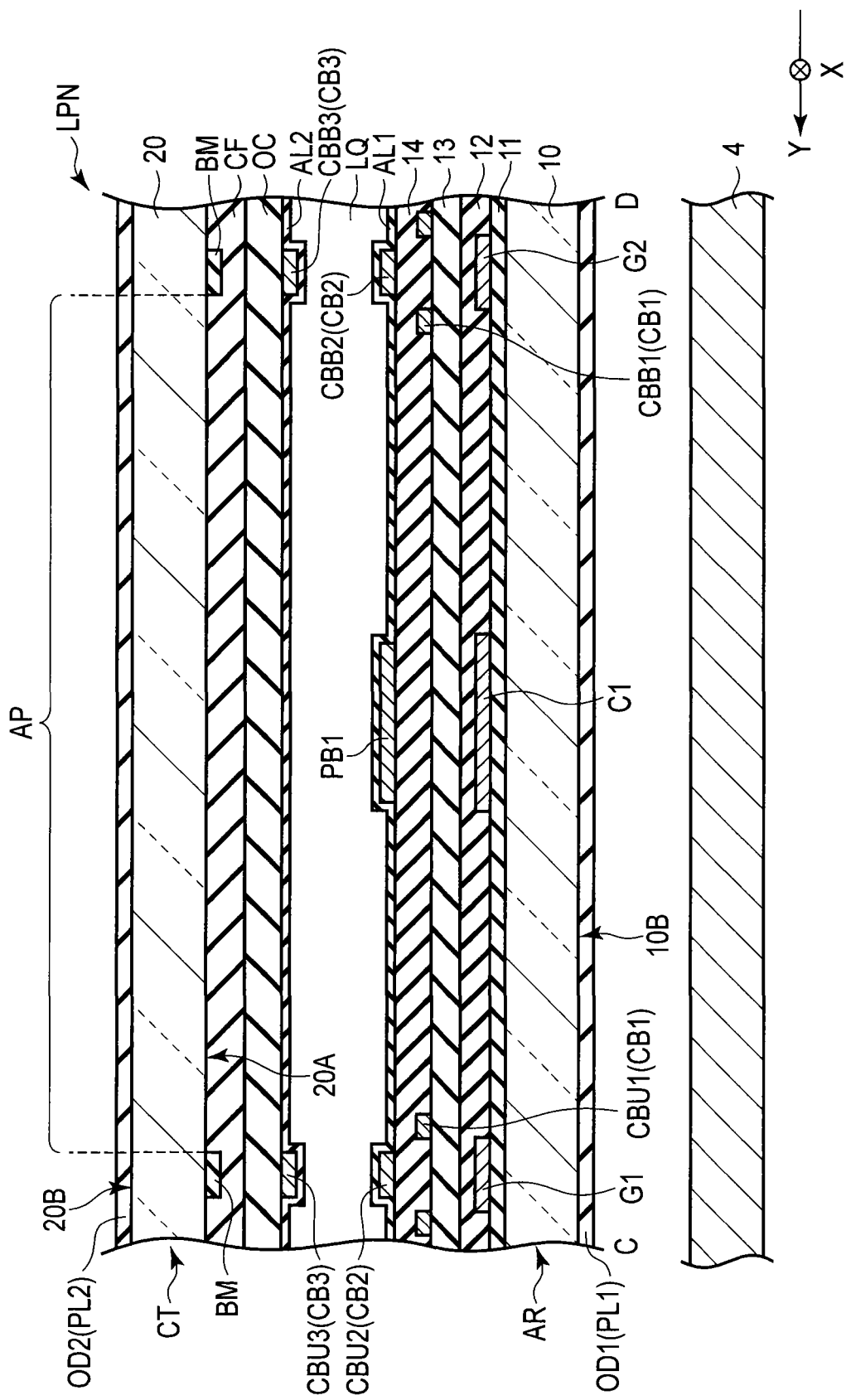
FIG. 5 is a schematic cross-sectional view, taken along line C-D in FIG. 3, showing a cross-sectional structure of the liquid crystal display panel LPN shown in FIG. 3.

FIG. 4 is a schematic cross-sectional view, taken along line A-B in FIG. 3, showing a cross-sectional structure of the liquid crystal display panel LPN shown in FIG. 3. FIG. 5 is a schematic cross-sectional view, taken along line C-D in FIG. 3, showing a cross-sectional structure of the liquid crystal display panel LPN shown in FIG. 3. FIG. 4 and FIG. 5 show only parts which are necessary for the description.

A backlight 4 is disposed on the back side of the array substrate AR which constitutes the liquid crystal display panel LPN. Various modes are applicable to the backlight 4. A description of the detailed structure of the backlight 4 is omitted.

The array substrate AR is formed by using a first insulative substrate 10 having light transmissivity. The array substrate AR includes, on the inside of the first insulative substrate 10, that is, on the side facing the counter-substrate CT, a gate line G1, a gate line G2, a storage capacitance line C1, a source line S1, a source line S2, a first pixel electrode PE1, a first common electrode CE1, a second common electrode CE2, a first insulation film 11, a second insulation film 12, a third insulation film 13, a fourth insulation film 14, and a first alignment film AL1.

A semiconductor layer of a switching element, which is not shown, is formed between the first insulative substrate 10 and first insulation film 11. The storage capacitance line C1, gate line G1 and gate line G2 are formed on the first insulation film 11, and are covered with the second insulation film 12. The source line S1 and the source line S2 are formed on the second insulation film 12 and are covered with the third insulation film 13. The third insulation film 13 corresponds to a first interlayer insulation film which is located above the gate line G1, gate line G2, source line S1 and source line S2.

The first main common electrode CAL1, first main common electrode CAR1, first sub-common electrode CBU1 and first sub-common electrode CBB1 of the first common electrode CE1 are formed on the third insulation film 13 and are covered with the fourth insulation film 14. The fourth insulation film 14 corresponds to a second interlayer insulation film which covers the first common electrode CE1. The third insulation film 13 and fourth insulation film 14 are formed of, for example, a transparent resin material, or an inorganic material such as silicon nitride. The first main common electrode CAL1 is opposed to the source line S1 via the third insulation film 13, and the first main common electrode CAR1 is opposed to the source line S2 via the third insulation film 13. The first sub-common electrode CBU1 is formed at a position displaced from a position immediately above the gate line G1, and the first sub-common electrode CBB1 is formed at a position displaced from a position immediately above the gate line G2.

The first main pixel electrode PA1 and first sub-pixel electrode PB1 of the first pixel electrode PE1, and the second main common electrode CAL2, second main common electrode CAR2, second sub-common electrode CBU2 and second sub-common electrode CBB2 of the second common electrode CE2 are formed on the fourth insulation film 14 and are covered with the first alignment film AL1. The first main pixel electrode PA1 is located between the second main common electrode CAL2 and the second main common electrode CAR2. The first sub-pixel electrode PB1 is located between the second sub-common electrode CBU2 and second sub-common electrode CBB2, and is opposed to the storage capacitance line C1 via the second insulation film 12, third insulation film 13 and fourth insulation film 14. The second main common electrode CAL2 is located above the source line S1, and is opposed to the first main common electrode CAL1 via the fourth insulation film 14. The second main common electrode CAR2 is located above the source line S2, and is opposed to the first main common electrode CAR1 via the fourth insulation film 14. The second sub-common electrode CBU2 is opposed to the gate line G1 via the second insulation film 12, third insulation film 13 and fourth insulation film 14. The second sub-common electrode CBB2 is opposed to the gate line G2 via the second insulation film 12, third insulation film 13 and fourth insulation film 14.

The first alignment film AL1 is disposed on that surface of the array substrate AR, which is opposed to the counter-substrate CT, and the first alignment film AL1 extends over substantially the entirety of the active area ACT. The first alignment film AL1 covers the first pixel electrode PE1 and the second common electrode CE2, and is also disposed on the fourth insulation film 14. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, third common electrode CE3 and second alignment film AL2, on the inside of the second insulative substrate 20, that is, on that side of the second insulative substrate 20, which is opposed to the array substrate AR.

The black matrix BM is formed on an inner surface 20A of the second insulative substrate 20, which is opposed to the array substrate AR, partitions each pixel PX and forms an aperture portion AP which is opposed to the first pixel electrode PE1. Specifically, the black matrix BM is disposed so as to be opposed to wiring portions, such as the source lines S, gate lines G and switching elements SW. In the example illustrated, the black matrix BM includes portions which are located above the source line S1 and source line S2 and extend in the second direction Y, and portions which are located above the gate line G1 and gate line G2 and extend in the first direction X, and the black matrix BM is formed in a grid shape.

The color filter CF is disposed in association with each pixel PX. Specifically, the color filter CF is disposed on an inside (aperture portion AP) partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF. The overcoat layer OC is formed of, for example, a transparent resin material.

The third main common electrode CAL3, third main common electrode CAR3, third sub-common electrode CBU3 and third sub-common electrode CBB3 of the third common electrode CE3 are formed on that side of the overcoat layer OC, which is opposed to the array substrate AR, and are located below the black matrix BM. The third main common electrode CAL3 is located above the source line S1, and is opposed to the second main common electrode CAL2. The third main common electrode CAR3 is located above the source line S2, and is opposed to the second main common electrode CAR2. The third sub-common electrode CBU3 is located above the gate line G1, and is opposed to the second sub-common electrode CBU2. The third sub-common electrode CBB3 is located above the gate line G2, and is opposed to the second sub-common electrode CBB2. In the aperture portion AP, regions between the first pixel electrode PE1 and the first common electrode CE1, second common electrode CE2 and third common electrode CE3 correspond to transmissive regions through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the third common electrode CE3 and the overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween. The cell gap is smaller than the distance between the first main pixel electrode PA1 and the first main common electrode CA1. The liquid crystal layer LQ is held in the cell gap which is created between the array substrate AR and the counter-substrate CT, and is disposed between the first alignment film AL1 and second alignment film AL2. The liquid crystal layer LQ is composed of a liquid crystal material including liquid crystal molecules LM and having, for example, a positive (positive-type) dielectric constant anisotropy.

A first optical element OD1 is attached to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1. In the meantime, another optical element, such as a retardation plate, may be disposed between the first polarizer PL1 and the first insulative substrate 10.

A second optical element OD2 is attached to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In an example shown in part (a) of FIG. 3, the first polarizer PL1 is disposed such that the first polarization axis AX1 thereof is parallel to the first direction X, and the second polarizer PL2 is disposed such that the second polarization axis AX2 thereof is parallel to the second direction Y. In an example shown in part (b) of FIG. 3, the second polarizer PL2 is disposed such that the second polarization axis AX2 thereof is parallel to the first direction X, and the first polarizer PL1 is disposed such that the first polarization axis AX1 thereof is parallel to the second direction Y.

Next, the operation of the liquid crystal display panel LPN having the above-described structure is described.

Specifically, in a state in which no voltage is applied to the liquid crystal layer LQ, that is, in a state (OFF time) in which no electric field is produced between the pixel electrode PE (first pixel electrode PE1) and common electrode CE (first common electrode CE1 and second common electrode CE2), the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

In the meantime, the initial alignment direction of the liquid crystal molecule LM corresponds to a direction in which the major axis of the liquid crystal molecule LM at the OFF time is orthogonally projected onto the X-Y plane. In this example, the first alignment treatment direction PD1 and the second alignment treatment direction PD2 are substantially parallel to the second direction Y and are identical. The liquid crystal molecule LM at the OFF time is initially aligned such that the major axis thereof is substantially parallel to the second direction Y, as indicated by a broken line in FIG. 3. In short, the initial alignment direction of the liquid crystal molecule LM is parallel to the second direction Y.

At this OFF time, part of light from the backlight 4 passes through the first polarizer PL1, and enters the liquid crystal display panel LPN. The light, which has entered the liquid crystal display panel LPN, is linearly polarized light which is perpendicular to the first polarization axis AX1 of the first polarizer PL1. The polarization state of linearly polarized light hardly varies when the light passes through the liquid crystal layer LQ at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and the common electrode CE, a lateral electric field (or an oblique electric field), which is substantially parallel to the substrates, is produced between the pixel electrode PE and the common electrode CE. The liquid crystal molecules LM are affected by the electric field between the pixel electrode PE and common electrode CE, and the alignment state thereof varies. In the example shown in FIG. 3, in the region between the first pixel electrode PE1 and third main common electrode CAL3, the liquid crystal molecule LM in a lower-half region rotates clockwise relative to the second direction Y, and is aligned in a lower left direction in the Figure, and the liquid crystal molecule LM in an upper-half region rotates counterclockwise relative to the second direction Y, and is aligned in an upper left direction in the Figure. In the region between the first pixel electrode PE1 and third main common electrode CAR3, the liquid crystal molecule LM in a lower-half region rotates counterclockwise relative to the second direction Y, and is aligned in a lower right direction in the Figure, and the liquid crystal molecule LM in an upper-half region rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the second pixel electrodes PE2, and domains are formed in the respective alignment directions. Specifically, a plurality of domains are formed in one pixel PX. Thereby, in the pixel PX, a transmissive region, through which backlight can pass, is formed between the pixel electrode PE and common electrode CE.

At the ON time, the polarization state of linearly polarized light, which has entered the liquid crystal display panel LPN, varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display). However, at positions overlapping the pixel electrode PE and common electrode CE, since the liquid crystal molecules are kept in the initial alignment state, black display is effected as in the case of the OFF time.

According to this embodiment, the array substrate AR includes two layers of sub-common electrodes (first sub-common electrode CB1 and second sub-common electrode CB2) which have the same potential (e.g. common potential) on the liquid crystal layer LQ side of each gate line G. The first sub-common electrode CB1, which is located in the lower layer, is located on the pixel electrode PE side of the gate line G, and the second sub-common electrode CB2, which is located in the upper layer, is located immediately above the gate line G. Since the first sub-common electrode CB1 and second sub-common electrode CB2 have the same potential, an equipotential surface is created between the first sub-common electrode CB1 and second sub-common electrode CB2. This equipotential surface shields an undesired leak electric field extending from the gate line G located in the lower layer toward the liquid crystal layer LQ. Thus, the influence of an undesired electric field in that area of the transmissive region, which is close to the gate line G, can be relaxed, and degradation in display quality can be suppressed.

In addition, since the first main common electrode CA1 or second main common electrode CA2 is opposed to the source line S, an undesired leak electric field from the source line S can also be shielded.

The first sub-common electrode CB1, which is closer to the gate line G, is disposed at a position displaced from a position immediately above the gate line G. Thus, formation of an undesired capacitance between the gate line G and first sub-common electrode CB1 can be suppressed, and a load of the gate line G can be reduced. Accordingly, a problem in display quality due to a load of the gate line G (e.g. an in-plane variance in flicker rate, or shortage of write time of pixel potential) can be suppressed. Furthermore, since the second sub-common electrode CB2, which is opposed to the gate line G, is located at a greater distance from the gate line G than the first sub-common electrode CB1, it is possible to reduce the influence on display by a capacitance which may be formed between the gate line G and the second sub-common electrode CB2.

Besides, since the third common electrode CE3 has a grid shape opposed to the second common electrode CE2 and has the same potential as the second common electrode CE2, an equipotential surface of a common potential is created between the second common electrode CE2 and third common electrode CE3. Since such an equipotential surface keeps the liquid crystal molecules in the initial alignment state at the ON time and OFF time even if misalignment occurs between the array substrate AR and counter-substrate CT, the occurrence of color mixture can be suppressed.

Figure 6B:
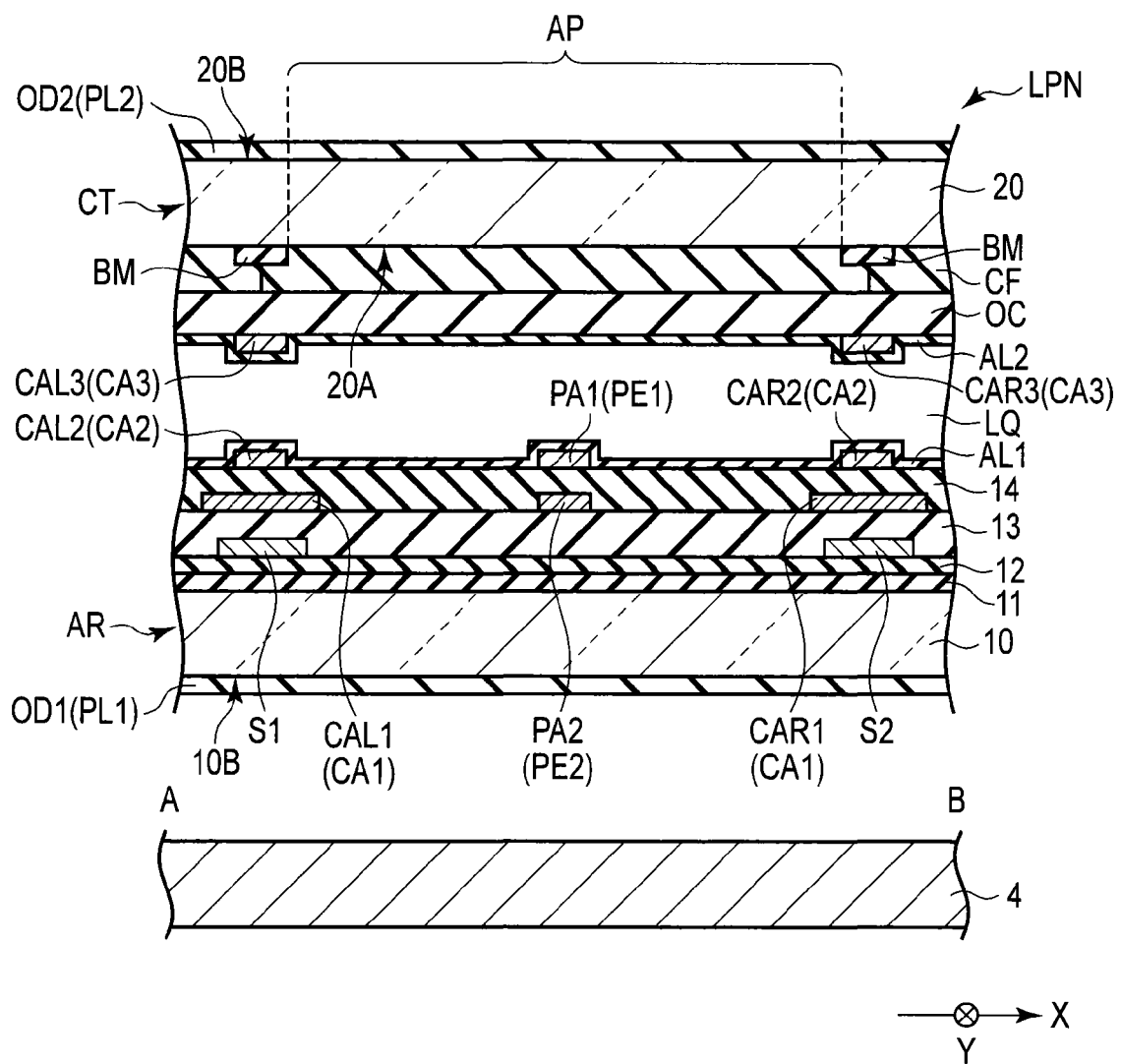
FIG. 6B is a schematic cross-sectional view, taken along line A-B in FIG. 6A, showing a cross-sectional structure of a liquid crystal display panel LPN shown in FIG. 6A.

FIG. 6A is a plan view which schematically illustrates another structure example of the pixel PX at a time when the array substrate AR shown in FIG. 1 is viewed from the counter-substrate side. FIG. 6B is a schematic cross-sectional view, taken along line A-B in FIG. 6A, showing a cross-sectional structure of a liquid crystal display panel LPN shown in FIG. 6A.

The illustrated structure example differs from the structure example shown in FIG. 2 in that the pixel electrode PE includes, in addition to the first pixel electrode PE1 which is located in the upper layer, a second pixel electrode PE2 which is located in the lower layer of the first pixel electrode PE1. In FIG. 6A, in order to clarify the first pixel electrode PE1 and second pixel electrode PE2, these are illustrated with the sizes varied. However, the second pixel electrode PE2 is formed in substantially the same shape as the first pixel electrode PE1, and the second pixel electrode PE2 is disposed at a position substantially overlapping the first pixel electrode PE1. Specifically, the second pixel electrode PE2 includes a strip-shaped second main pixel electrode PA2 extending in the second direction Y, and a strip-shaped second sub-pixel electrode PB2 extending in the first direction X. The second sub-pixel electrode PB2 is opposed to the storage capacitance line C1. The first pixel electrode PE1 includes a strip-shaped first main pixel electrode PA1 which extends in the second direction Y and is opposed to the second main pixel electrode PA2, and a strip-shaped first sub-pixel electrode PB1 which extends in the first direction X and is opposed to the second sub-pixel electrode PB2. The second pixel electrode PE2 is electrically connected to the switching element SW, for example, at a position where the second sub-pixel electrode PB2 overlaps the storage capacitance line C1. The first pixel electrode PE1 is electrically connected to the second pixel electrode PE2. Like the first common electrode CE1, the second pixel electrode PE2 including the second main pixel electrode PA2 is formed on the third insulation film 13 and is covered with the fourth insulation film 14.

The counter-substrate CT including the third common electrode CE3 shown in FIG. 3 is applicable to the array substrate AR of this structure example. Thereby, the same advantageous effects as in the above-described structure example can be obtained. In addition, at the ON time, since the pixel electrode PE includes the first pixel electrode PE1 and second pixel electrode PE2, a necessary electric field for controlling the alignment of liquid crystal molecules is produced between the first pixel electrode PE1 and the second common electrode CE2 and third common electrode CE3, and a shield electric filed is produced between the second pixel electrode PE2 and the first common electrode CE1. This shield electric field shields an undesired leak electric field from the source line S, which occurs due to a potential difference between the source line S and gate line G and the first pixel electrode PE1. Therefore, the production of the undesired electric field from the source line S and gate line can further be suppressed, and degradation in display quality can be suppressed.

FIG. 7 is a plan view which schematically illustrates another structure example of the pixel PX at a time when the array substrate AR shown in FIG. 1 is viewed from the counter-substrate side.

The illustrated structure example differs from the structure example shown in FIG. 2 in that the storage capacitance line C1 is located closer to the gate line G2 than to the gate line G1, and the first pixel electrode PE1 is formed in a T shape. Specifically, the distance in the second direction Y between the storage capacitance line C1 and the gate line G2 is less than the distance in the second direction Y between the storage capacitance line C1 and the gate line G1. The first sub-pixel electrode PB1 of the first pixel electrode PE1 is opposed to the storage capacitance line C1 and is continuous with one end portion of the first main pixel electrode PA1, which is located on the gate line G2 side in the second direction Y.

The counter-substrate CT including the third common electrode CE3 shown in FIG. 3 is applicable to the array substrate AR of this structure example.

Figure 8:
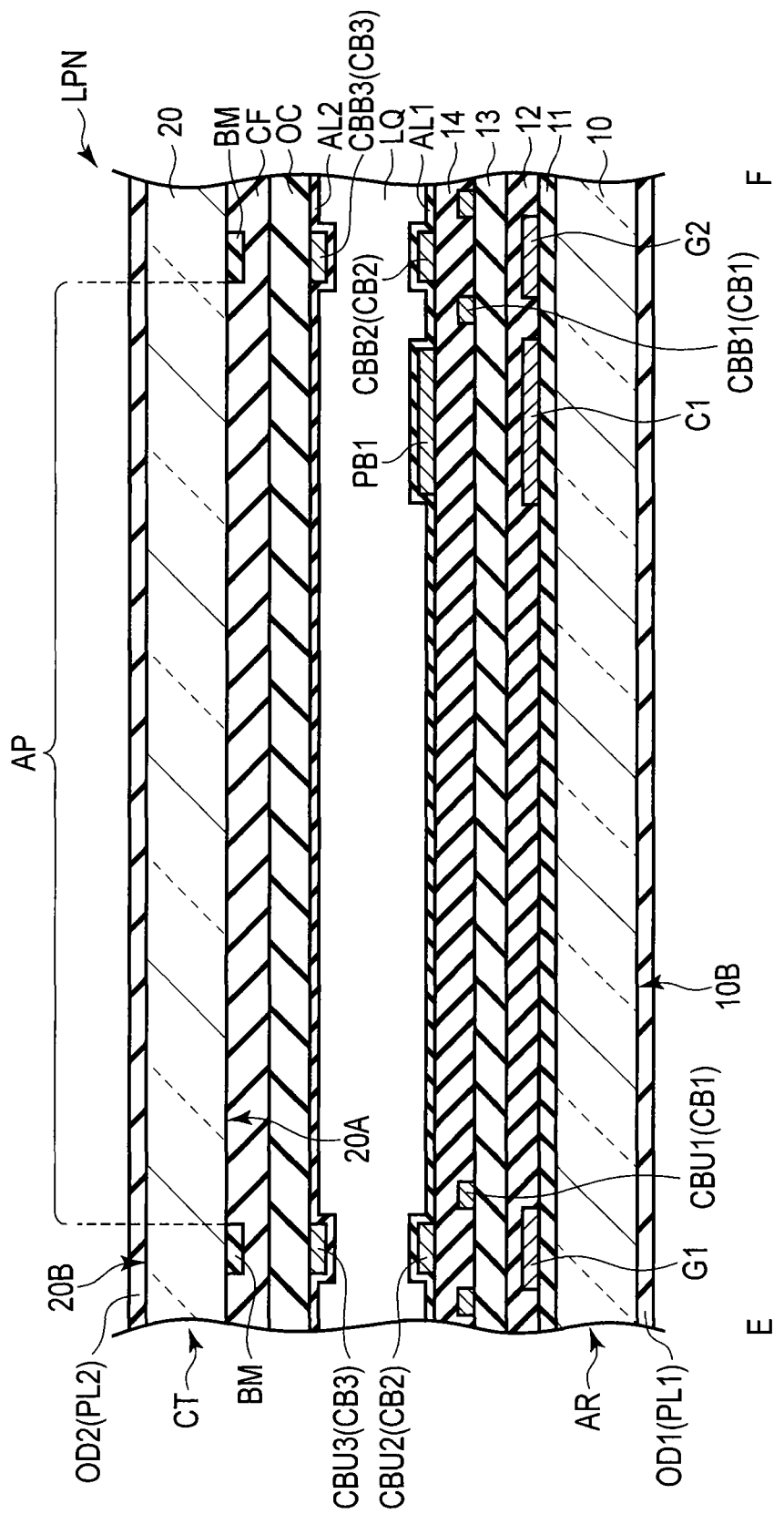
FIG. 8 is a schematic cross-sectional view, taken along line E-F in FIG. 7, showing a cross-sectional structure of a liquid crystal display panel LPN shown in FIG. 7.

FIG. 8 is a schematic cross-sectional view, taken along line E-F in FIG. 7, showing a cross-sectional structure of a liquid crystal display panel LPN shown in FIG. 7. Incidentally, the cross-sectional structure of the liquid crystal display panel LPN, which is cut along line A-B in FIG. 7, is the same as shown in FIG. 4.

A description is mainly given of the positional relationship between the first pixel electrode PE1 and the storage capacitance line C1 in the array substrate AR. The other structure is denoted by the same reference numerals as in the structure example shown in FIG. 5, and a detailed description thereof is omitted.

The storage capacitance line C1 is formed on the first insulation film 11 and is covered with the second insulation film 12. The storage capacitance line C1 is located closer to the gate line G2 than to the gate line G1, and is spaced apart from the gate line G2. The first sub-pixel electrode PB1 is formed on the fourth insulation film 14 and is covered with the first alignment film AL1. The first sub-pixel electrode PB1 is spaced apart from the second sub-common electrode CBB2, and is opposed to the storage capacitance line C1 via the second insulation film 12, third insulation film 13 and fourth insulation film 14. The first sub-common electrode CBB1 is located between the storage capacitance line C1 and gate line G2, or between the first sub-pixel electrode PB1 and second sub-common electrode CBB2.

In the structure example described with reference to FIG. 7 and FIG. 8, the same advantageous effects as in the above-described structure example can be obtained.

FIG. 9 is a plan view which schematically illustrates another structure example of the pixel PX at a time when the array substrate AR shown in FIG. 1 is viewed from the counter-substrate side.

The illustrated structure example differs from the structure example shown in FIG. 7 in that the pixel electrode PE includes, in addition to the first pixel electrode PE1 which is located in the upper layer, a second pixel electrode PE2 which is located in the lower layer of the first pixel electrode PE1. In FIG. 9, in order to clarify the first pixel electrode PE1 and second pixel electrode PE2, these are illustrated with the sizes varied. However, the second pixel electrode PE2 is formed in substantially the same shape as the first pixel electrode PE1, and the second pixel electrode PE2 is disposed at a position substantially overlapping the first pixel electrode PE1. Specifically, the second pixel electrode PE2 includes a strip-shaped second main pixel electrode PA2 extending in the second direction Y, and a strip-shaped second sub-pixel electrode PB2 extending in the first direction X. The second sub-pixel electrode PB2 is opposed to the storage capacitance line C1. The first pixel electrode PE1 includes a strip-shaped first main pixel electrode PA1 which extends in the second direction Y and is opposed to the second main pixel electrode PA2, and a strip-shaped first sub-pixel electrode PB1 which extends in the first direction X and is opposed to the second sub-pixel electrode PB2. Like the first common electrode CE1, the second pixel electrode PE2 is formed on the third insulation film 13 and is covered with the fourth insulation film 14. In this case, the second sub-pixel electrode PB2 is spaced apart from the first sub-common electrode CBB1. In the case where the pixel electrode PE has a double-layer structure including the first pixel electrode PE1 and second pixel electrode PE2 and each of the first pixel electrode PE1 and second pixel electrode PE2 has the same T shape, the first sub-pixel electrode PB1 is located close to the second sub-common electrode CBB2, and the second sub-pixel electrode PB2 is located close to the first sub-common electrode CBB1. In particular, the first sub-common electrode CBB1 is located on the pixel electrode PE side of the gate line G, and is located close to the second sub-pixel electrode PB2. In the case where the pixel size is reduced by microfabrication and the inter-line distance or inter-electrode distance is decreased, the second sub-pixel electrode PB2 may be omitted, or the cross-shaped pixel electrode PE, as shown in FIG. 6, may be applied, or the structure example in which the second pixel electrode PE2 is omitted, as shown in FIG. 7 and FIG. 8, may be applied, in order to avoid short-circuit between the pixel electrode PE and common electrode CE.

The counter-substrate CT including the third common electrode CE3 shown in FIG. 3 is applicable to the array substrate AR of this structure example. Thereby, the same advantageous effects as in the above-described structure example can be obtained.

Next, a modification is described.

The array substrates AR shown in FIG. 2, FIG. 6A, FIG. 7 and FIG. 9 may be combined with a counter-substrate CT which does not include the third common electrode CE3.

Figure 10:
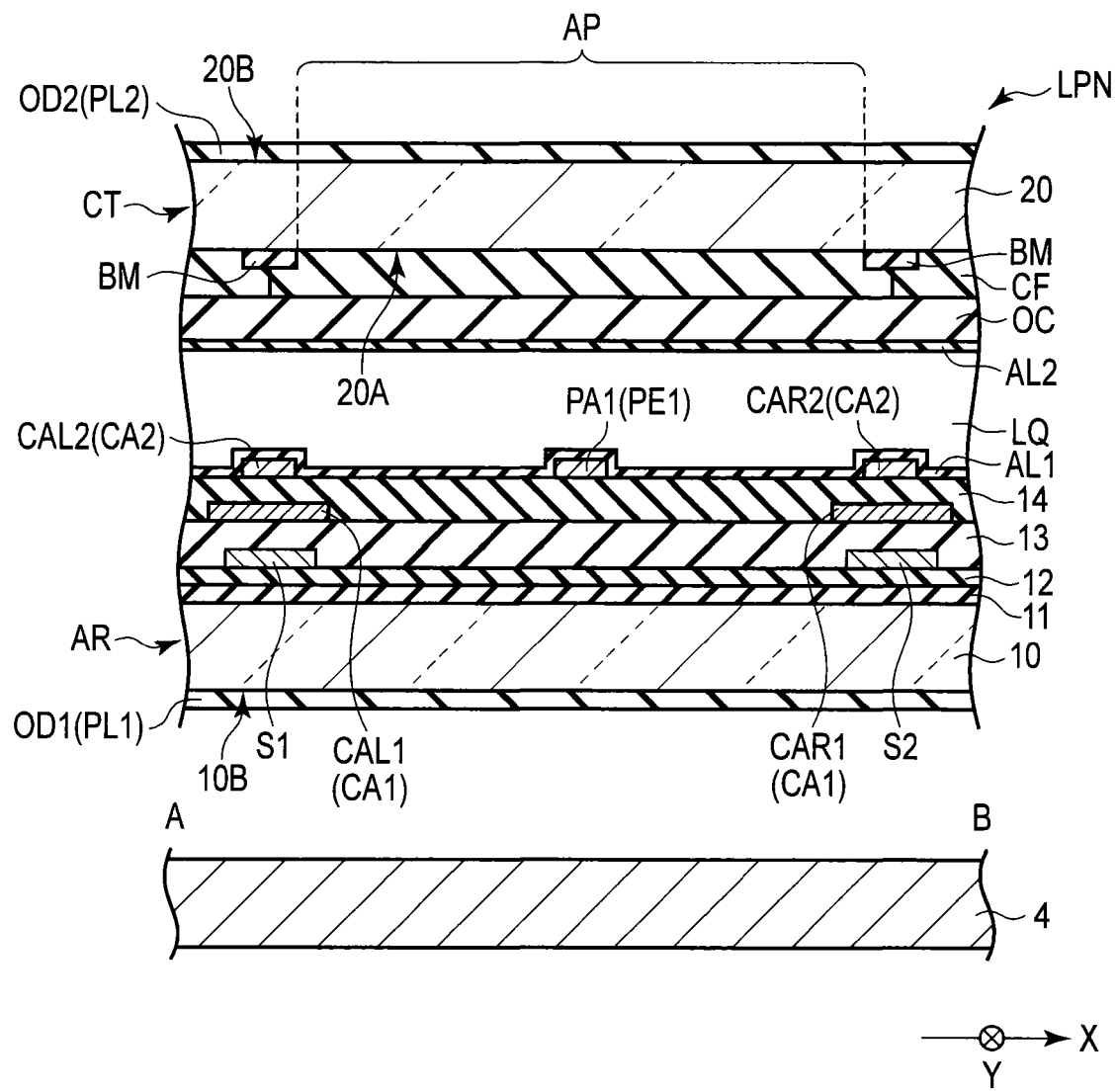
FIG. 10 is a cross-sectional view which schematically illustrates a cross-sectional structure of a liquid crystal display panel LPN according to a modification.

FIG. 10 is a cross-sectional view which schematically illustrates a cross-sectional structure of a liquid crystal display panel LPN according to a modification.

The modification illustrated differs from the structure example shown in FIG. 4 in that the third common electrode of the counter-substrate CT is omitted. In the counter-substrate CT, the entire surface of the overcoat layer OC, which is located on the array substrate AR side, is covered with the second alignment film AL2. In this structure example, at the ON time, a necessary electric field for controlling the alignment of liquid crystal molecules is mainly produced between the first main pixel electrode PA1 of the first pixel electrode PE1 and the second main common electrode CA2 of the second common electrode CE2. On the other hand, like the above-described structure examples, the first common electrode CE1 and second common electrode CE2 shield an undesired leak electric field from the gate line and source line. Therefore, degradation in display quality can be suppressed.

As has been described above, according to the present embodiment, a liquid crystal display device, which can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a gate line extending in a first direction, a source line extending in a second direction crossing the first direction, a switching element electrically connected to the gate line and the source line, a first interlayer insulation film located above the gate line and the source line, a first common electrode including a first sub-common electrode extending along the gate line on the first interlayer insulation film, a second interlayer insulation film covering the first common electrode, a pixel electrode which includes a first main pixel electrode extending in the second direction on the second interlayer insulation film and is electrically connected to the switching element, and a second common electrode which includes a second sub-common electrode extending in parallel to the first sub-common electrode on the second interlayer insulation film and has the same potential as the first common electrode, the first sub-common electrode being located on the pixel electrode side of a position overlapping the gate line, and the second sub-common electrode being opposed to the gate line;
a second substrate including a third common electrode which includes a third main common electrode extending in the second direction and a third sub-common electrode opposed to the second sub-common electrode, the third common electrode having the same potential as the second common electrode; and
a liquid crystal layer held between the first substrate and the second substrate.

2. The liquid crystal display device of claim 1, wherein the pixel electrode further includes a second main pixel electrode which extends in the second direction on the first interlayer insulation film, is opposed to the first main pixel electrode, and is covered with the second interlayer insulation film.

3. The liquid crystal display device of claim 1, wherein the pixel electrode is formed in a cross shape or a T shape including a first sub-pixel electrode which is continuous with the first main pixel electrode and extends in the first direction.

4. The liquid crystal display device of claim 1, wherein the first common electrode further includes a first main common electrode extending along the source line, and the second common electrode further includes a second main common electrode which extends in parallel to the first main common electrode and is opposed to the third main common electrode.

5. A liquid crystal display device comprising:
a first substrate including a first gate line and a second gate line each extending in a first direction, a first source line and a second source line each extending in a second direction crossing the first direction, a switching element electrically connected to the first gate line and the first source line, a first interlayer insulation film located above the first gate line, the second gate line, the first source line and the second source line, a first common electrode with a grid shape extending along the first gate line, the second gate line, the first source line and the second source line on the first interlayer insulation film, a second interlayer insulation film covering the first common electrode, a pixel electrode which includes a first main pixel electrode extending in the second direction on the second interlayer insulation film and is electrically connected to the switching element, and a second common electrode which has a grid shape extending in parallel to the first common electrode on the second interlayer insulation film and has the same potential as the first common electrode, the first common electrode including a first segment located on the pixel electrode side of a position overlapping the first gate line and a second segment located on the pixel electrode side of a position overlapping the second gate line, and the second common electrode including a third segment opposed to the first gate line and a fourth segment opposed to the second gate line;
a second substrate including a third common electrode having a grid shape opposed to the second common electrode and having the same potential as the second common electrode; and
a liquid crystal layer held between the first substrate and the second substrate.

6. The liquid crystal display device of claim 5, wherein the first substrate further includes a storage capacitance line extending in the first direction and located at a middle point between the first gate line and the second gate line.

7. The liquid crystal display device of claim 6, wherein the pixel electrode is formed in a cross shape including a sub-pixel electrode which is opposed to the storage capacitance line, is continuous with a middle portion of the first main pixel electrode and extends in the first direction.

8. The liquid crystal display device of claim 5, wherein the first substrate further includes a storage capacitance line extending in the first direction and located closer to the second gate line than to the first gate line.

9. The liquid crystal display device of claim 8, wherein the pixel electrode is formed in a T shape including a sub-pixel electrode which is opposed to the storage capacitance line, is continuous with one end portion of the first main pixel electrode and extends in the first direction.

10. The liquid crystal display device of claim 5, wherein the first main pixel electrode is located at a middle point between the first source line and the second source line.

11. The liquid crystal display device of claim 5, wherein the pixel electrode includes a second main pixel electrode which extends in the second direction on the first interlayer insulation film, is opposed to the first main pixel electrode and is covered with the second interlayer insulation film.

12. A liquid crystal display device comprising:
a first substrate including a first gate line and a second gate line each extending in a first direction, a first source line and a second source line each extending in a second direction crossing the first direction, a switching element electrically connected to the first gate line and the first source line, a first interlayer insulation film located above the first gate line, the second gate line, the first source line and the second source line, a first common electrode with a grid shape extending along the first gate line, the second gate line, the first source line and the second source line on the first interlayer insulation film, a second interlayer insulation film covering the first common electrode, a pixel electrode which includes a first main pixel electrode extending in the second direction on the second interlayer insulation film and is electrically connected to the switching element, and a second common electrode which has a grid shape extending in parallel to the first common electrode on the second interlayer insulation film and has the same potential as the first common electrode, the first common electrode including a first segment located on the pixel electrode side of a position overlapping the first gate line and a second segment located on the pixel electrode side of a position overlapping the second gate line, and the second common electrode including a third segment opposed to the first gate line and a fourth segment opposed to the second gate line;

a second substrate disposed to be opposed to the first substrate; and a liquid crystal layer held between the first substrate and the second substrate.

13. The liquid crystal display device of claim 12, wherein the first substrate further includes a storage capacitance line extending in the first direction and located at a middle point between the first gate line and the second gate line.

14. The liquid crystal display device of claim 13, wherein the pixel electrode is formed in a cross shape including a sub-pixel electrode which is opposed to the storage capacitance line, is continuous with a middle portion of the first main pixel electrode and extends in the first direction.

15. The liquid crystal display device of claim 12, wherein the first substrate further includes a storage capacitance line extending in the first direction and located closer to the second gate line than to the first gate line.

16. The liquid crystal display device of claim 15, wherein the pixel electrode is formed in a T shape including a sub-pixel electrode which is opposed to the storage capacitance line, is continuous with one end portion of the first main pixel electrode and extends in the first direction.

* * * * *